Aug. 6, 1963  C. F. BOWERSETT  3,099,959
ROCKET ENGINE
Filed Nov. 7, 1961  2 Sheets-Sheet 1

INVENTOR.
CHARLES F. BOWERSETT
BY W. E. Duesenberry
J. E. Hodges
R. M. Hicks
ATTYS.

Aug. 6, 1963  C. F. BOWERSETT  3,099,959
ROCKET ENGINE

Filed Nov. 7, 1961  2 Sheets-Sheet 2

INVENTOR.
CHARLES F. BOWERSETT
BY W. E. Duesenberry
O. E. Hodges
R. M. Hicks   ATTYS.

3,099,959
ROCKET ENGINE
Charles F. Bowersett, Burtonsville, Md., assignor to the United States of America as represented by the Secretary of the Navy
Filed Nov. 7, 1961, Ser. No. 150,843
10 Claims. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

This invention relates to a rocket engine and more particularly to a rocket engine for a depth bomb or other missile launched beneath the surface of the water from a submarine in which the rocket motor propels the depth charge in an upward direction beyond the surface of the water along a trajectory through the air and at a selected point on the trajectory the depth bomb is detached from the rocket motor and continues onward toward the target area under its own momentum and the gravitational force applied thereto.

In rocket engines of this type heretofore devised it has been the usual practice to provide a heavy walled casing within which the propellant is disposed of sufficient thickness to withstand both internal and external pressures applied thereto under the conditions of service and the heat of combustion of the propellant. Furthermore such devices usually employ a grain propellant of the center perforated type ignited by a single ignitor within the center perforation and provided with a heavy thrust reversal valve for effecting a discharge of the rocket gases in a forward direction sufficiently to effect separation of the motor and the depth charge when the depth charge is disconnected therefrom.

These devices have not proved altogether satisfactory under the conditions of service by reason of the additional dead weight imparted thereto by heavy wall casing and the other parts such as the igniter which continues to be carried by the casing after it has fulfilled its function, the additional weight of the thrust reversal valve and the reduction in the quantity of propellant originally stored within the casing by reason of the performation therein.

The rocket engine according to the present invention possesses all of the advantages of the prior art devices of this character and none of the foregoing disadvantages. In accordance with the present invention this desirable result is achieved by providing a thin walled casing of generally cylindrical configuration to which is secured, as by welding the parts together, a bulkhead, the interior of the casing and the side of the bulkhead facing the combustion chamber being lined with a plastic sleeve bonded thereto for reinforcing the casing against pressure applied externally thereto and for insulating the casing from the heat generated by the burning of the propellant grain. The other bulkhead is bolted to the rocket casing after the propellant has been placed therein. Ignition of the propellant is effected by a pair of pyrogen ignitors initially disposed within two of the exhaust nozzles and secured to a rear cover cap which is blown free of the motor by the pressure of the exhaust gases as the propellant is fired. The forward end of the motor is provided with a plurality of forwardly extending nozzles in communication with a plenum chamber at the front end of the propellant. The front end of the propellant is ignited by an additional pyrogen igniter as the rocket motor is disconnected from the depth bomb during flight thereby to set up a thrust force in the reverse direction sufficient to cause the depth bomb to move away from the rocket motor as the rocket motor is disconnected therefrom.

One of the objects of this invention is to provide a new and improved rocket motor having a high thrust to weight ratio.

Another object is to provide a rocket motor of improved efficiency and adapted for underwater launching in which the propellant igniter means is detached therefrom as the propellant is ignited.

A further object is to provide a rocket motor having new and improved means for reinforcing the interior of the combustion chamber against pressure applied externally thereto and to thermally insulate the walls of the combustion chamber from the heat of the burning propellant.

A still further object is to provide a new and improved rocket motor having a solid end burning grain propellant secured therein for driving the motor forwardly when one end of the propellant is ignited and for effecting a reversal of the driving force as the opposite end of the propellant is ignited.

A still further object is to provide a rocket motor having new and improved means for thermally insulating the interior walls of the combustion chamber and a plurality of cables disposed interiorly therealong.

Still other objects, advantages and improvements will be apparent from the following description taken in connection with the accompanying drawings of which:

Figure 1:
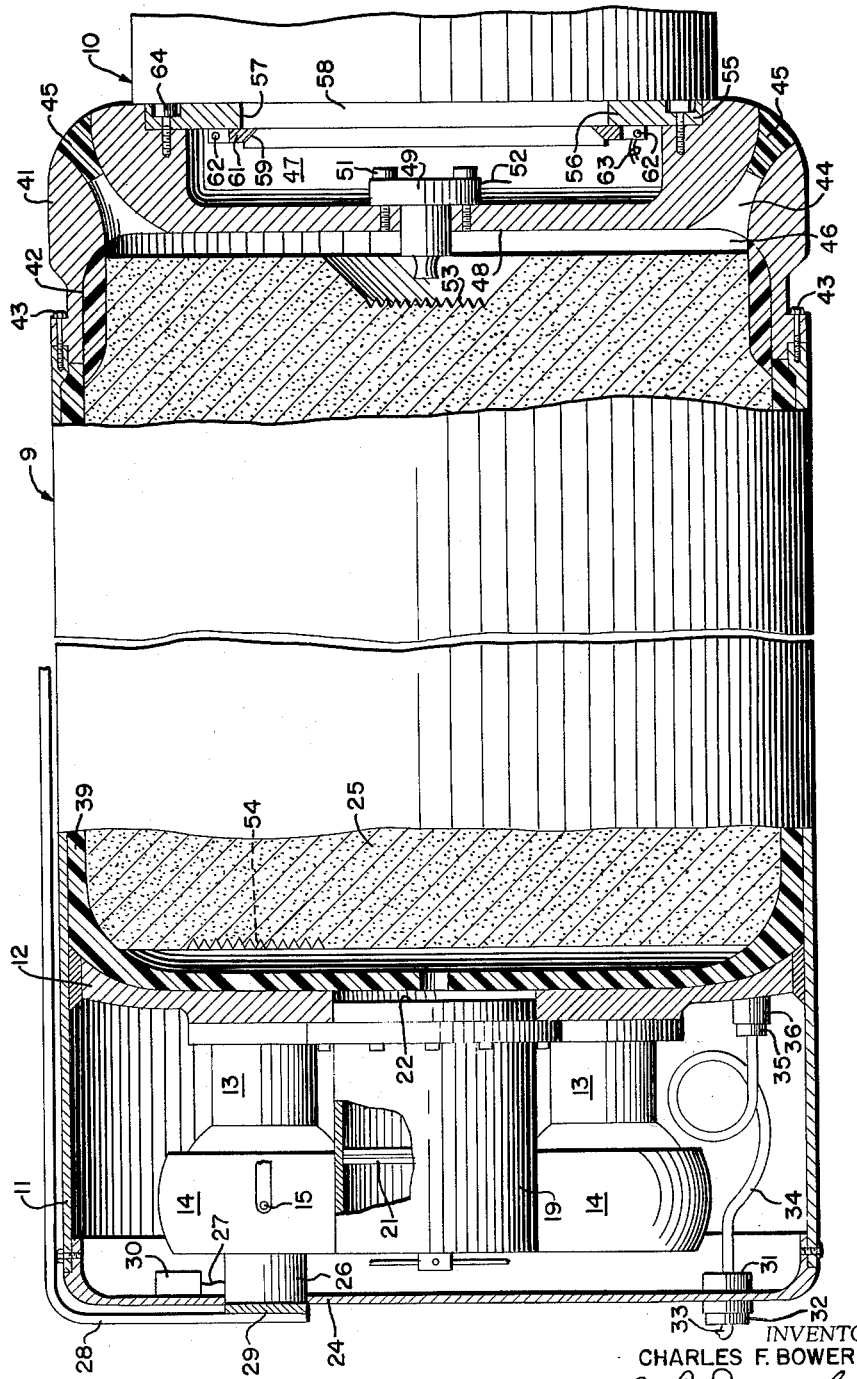
FIG. 1 is a view in elevation, partially in section and partially broken away, of a rocket motor having a depth bomb secured thereto according to a preferred form of the invention.
Figure 2:
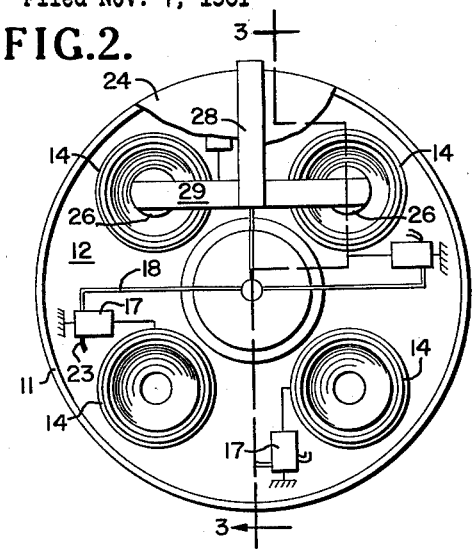
FIG. 2 is an end view partially broken away and somewhat reduced of the motor of FIG. 1.
Figure 3:
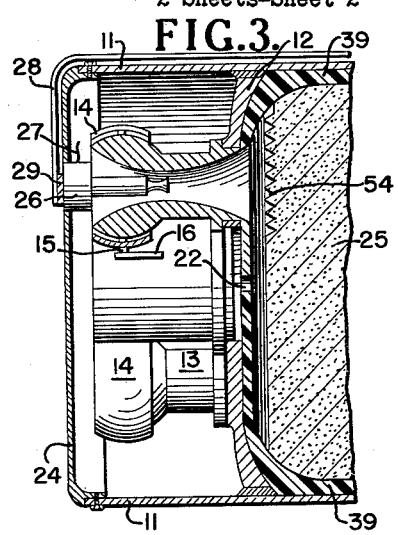
FIG. 3 is a view of the device of FIG. 2 taken along the line 3—3 thereof.
Figure 4:
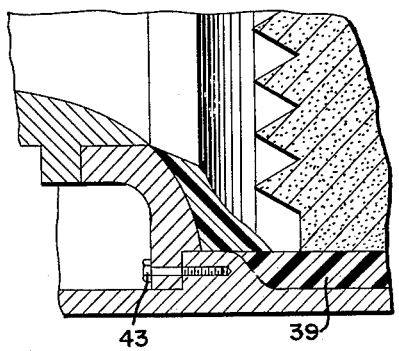
FIG. 4 is an enlarged fragmentary view partially in section of the rear bulkhead of the rocket motor according to an alternative form thereof.
Figure 5:
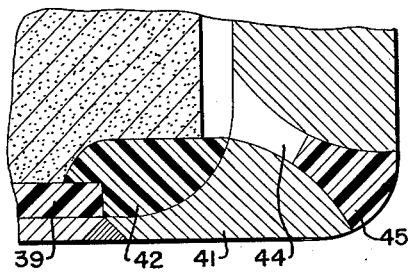
Figure 6:
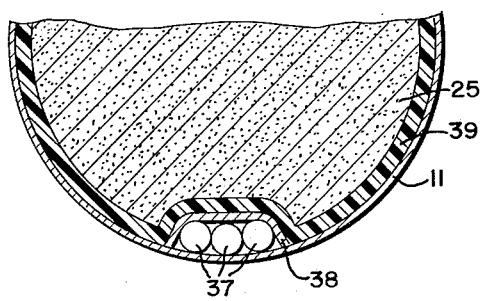

FIG. 5 is a sectional view somewhat enlarged and partially broken away of the front bulkhead of the device of FIG. 1 according to an alternative form thereof; and FIG. 6 is a transverse sectional view partially broken away of the combustion chamber at a substantially mid portion thereof on which is shown a shielded conduit secured interiorly to the casing and having a plurality of electrical cables therein.

Referring now to the drawings, on which like numerals of reference are employed throughout the various views to designate like or similar parts, for a more complete understanding of the invention and more particularly FIG. 1 thereof, there is shown thereon a rocket motor according to the present invention generally indicated by the numeral 9 secured to a depth bomb 10 for propulsion thereof through the water and thereafter through the air toward a predetermined target area. The rocket motor comprises a cylindrical casing composed of material suitable for the purpose, such for example, as high strength steel of thin construction to which is secured, as by welding, a rear bulkhead 12 having four jet nozzles 13 secured thereto in quadrately spaced relation, each of said nozzles being provided with a moveable shield 14 pivoted as at 15 for arcuate movement thereabout in a manner to deflect the exhaust gases issuing from the nozzle and thereby apply a steering control variable in accordance with the degree of movement of the shield from an initial position in alignment with the nozzle. The shields or deflectors 14 are moved by control arm 16 to which is connected a hydraulically actuated control element 17 connected as by a duct to a source of hydraulic pressure 19. The pressure is obtained from an oil filled cylinder having a piston 21 slidably moveable therein and in communication with the interior of the combustion chamber by an aperture 22 formed within the rear bulkhead. Each of the control elements 17 is provided with a solenoid actuated valve member controlling the operation of a piston therein selectively in accordance with electrical signals applied thereto by cable 23 and originating within the depth bomb. The details of operation form no part of the present invention and it is deemed, therefore, unnecessary to describe them in greater detail.

A cover 24 is secured to the rear end portion of casing 11 by a plurality of shearable bolts substantially as shown in such manner that the cover 24 is detached and blown free of the rocket motor as the propellant 25 therein is fired. A pair of pyrogen igniters 26 are disposed within a pair of nozzles substantially as shown when the cover 24 to which they are secured is in the assembled position. The pyrogen igniters are ignited by a firing signal applied to conductor 27 secured thereto. The rocket motor and depth charge assembly are adapted to be launched from a torpedo launching tube of a submarine. A safety bar 28 having a cross piece 29 secured thereto abuts the outer ends of the igniters 26 and maintains them in a safe position within their respective nozzles until the safety bar has been detached in response to the movement of the depth charge and rocket motor out of the launching tube, as is well known in devices of the character. As the cross piece moves away from the pyrogen igniters a switch or relay delay mechanism 30 is actuated to close the firing circuit from a source of electrical energy within the depth bomb to the igniters and thereby set them in operation a short period of time, such, for example, as a second or two after the safety bar has been detached.

There is also provided on the cover 24 a multi-contact jack 31 engageable by plug 32 for establishing a plurality of control circuits from the device by way of cable 33 to the submarine. The inner portion of plug 31 is connected by way of cable 34 to storage and control devices within the depth bomb, the cable 34 being preferably connected to a plug 35 adapted to engage jack 36 which may be conveniently secured to bulkhead 12 thereby to provide a slip connection which would be separable when the cover 24 is detached from the rocket motor. The jack 36 may be connected to the cables 37 disposed within a duct 38 secured to the interior surface of casing 11 throughout the length thereof in a suitable manner as by welding the parts together. Certain of the wires within one of the cables 37, it will be understood, are connected to cable 33 thereby to establish a control connection to the control elements 17 whereby the rocket motor may be steered in flight toward a target area. The cables 23, it will be understood, are not included in the connections to plug 35 and are therefore effective to maintain a steering control after the cap 34 has been detached.

A plastic liner 39 composed of material suitable for the purpose is bonded to the interior of casing 11 and bulkhead 12 in the manner shown within which the end burning propellant 25 is snugly fitted. A front bulkhead 41 having a plastic lining 42 bonded thereto substantially as shown is secured to the casing 11 as by the bolts 43. The front bulkhead is provided with a plurality of jet nozzles 44 initially sealed by plastic plugs 45 and in communication with a plenum chamber 46 formed between the end of the propellant and an inner end surface of the front bulkhead. The bulkhead is also recessed at 47 to provide a relatively thin wall 48 having an aperture in a central portion thereof to receive a pyrogen igniter 49 secured thereto as by the bolts 51 and provided with a cable 52 for establishing a firing circuit thereto from the control apparatus within the depth bomb. The inner end of the igniter 49 extends into a recessed portion of the propellant 25 having a serrated surface 53 to facilitate ignition of the propellant, similar serrated surfaces 54 being also provided in the opposite end surface of the propellant in juxtaposition to the jet nozzles 13 as shown to facilitate ignition by the pyrogen igniters 26. The front bulkhead 41 is provided with a register 55 to receive an annular plate 56 having an aperture 57 therein through which a circular supporting member 58 is adapted to pass. The member 58 is provided with a tapered recess 59 adapted to receive an expansible metal band 61 provided with a pair of explosive bolts 62 whereby the band is held together by the bolts in snug tight fitting relation with the tapered recess 59 thereby to hold the depth bomb 10 tightly secured to plate 56 until the bolts are exploded by a signal applied to conductor 63 by control apparatus within the depth bomb. The metal band 61 is composed of arcuate sections held together by the explosive bolts in such manner that the band is released from locking engagement with tapered recess 59 of the support 58 as the bolts are fired. The plate 56 is bolted to the front bulkhead 41 by bolts 64 through access holes within the depth bomb thereby to detachably secure the depth bomb to the rocket motor in the manner illustrated. The cables 37, it will be understood, terminate in a plug and jack arrangement disposed between the depth bomb 10 and the front bulkhead 41 whereby the electrical connection between the rocket motor and the bomb will be interrupted as the bomb moves away from the rocket motor upon disconnection therefrom during flight through the air.

The operation of the device will now be described with reference to a particular example. Let it be assumed, by way of example, that the device has been installed within the launching tube of a submarine with the safety bar 28 in position with respect thereto and jack 32 engaged by plug 31. Let it further be assumed that the proper signals have been transmitted to the depth bomb over cable 33 to control the flight thereof toward a selected target area. The plug 32 is now removed from jack 31 and the device is launched from the submarine tube in a manner similar to the launching of a torpedo therefrom. When the device has cleared the outer end of the launching tube, safety bar 28 is disengaged from the rocket motor causing a circuit to be closed by relay 30 after a small delay of one or two seconds to fire the pyrogen igniters 26. When this occurs the rear end of the end burning propellant 25 is ignited causing the cover 24 with the igniters 26 secured thereto to be detached from the rocket motor. A control is now applied to the moveable shield deflectors 14 to cause the rocket driven depth bomb to emerge from the water and proceed along a trajectory in the direction of the target area.

When the device has reached a predetermined point along the trajectory, a firing signal is applied to pyrogen igniter 49 causing the front end of the solid burning propellant to be ignited, the pressure of the gases of combustion causing plugs 45 to be suddenly ejected from jet nozzles 44 and the exhaust gases to issue from these jet nozzles in a direction and of a magnitude sufficient to overcome the forward propulsion force of the jets issuing through nozzles 13 and thereby removing the driving force applied to the depth bomb 10. Concurrently therewith the explosive bolts 62 are operated thereby unlocking the depth bomb from the rocket motor. The depth bomb now proceeds along its trajectory and the rocket motor drops into the sea.

Whereas the invention has been described with particularly with reference to an example thereof which gives satisfactory results, it is not so limited as it will be apparent to others, after understanding the invention, that various changes and modification may be made without departing from the spirit and scope of the invention and it is intended, therefore, in the appended claims to cover all such changes and modifications.

What is claimed as new and desired to be secured by Letters Patent of the United States:

1. A rocket engine for a subaqueously launched missile and having a thin metal cylindrical shell, a plastic liner bonded to the interior surface of the shell along the length thereof for reinforcing the shell against pressure applied externally thereto as the missile is launched, a quantity of end burning propellant explosive filling said liner, a bulkhead having a plurality of nozzle throats thereon secured interiorly within said shell, thrust vectoring means and an activated power supply therefor on said bulkhead, a blow off cover detachably secured to one end of said shell and initially enclosing said nozzle throats and activated power supply, means carried by said cover for igniting an end portion of the explosive through each of said throats, an additional bulkhead on the other end of said shell having an igniter carried thereby for igniting the opposite end portion of said explosive, an ignition circuit for said igniter, a plurality of thrust reversal nozzles formed in said additional bulkhead for causing a thrust reversal force to be applied to said engine when the igniter has ignited the opposite end portion of said explosive, a plurality of electrical cables, and a conduit disposed longitudinally within said shell and secured thereto for enclosing and supporting said electrical cables, said cables establishing a plurality of control circuits to said thrust vectoring means, said plastic liner covering said conduit thereby to additionally insulate said cables thermally from the heat of combustion of said propellant explosive.

2. A rocket engine according to claim 1 including a layer of plastic material bonded to the interior surface of the first-named bulkhead in juxtaposition with the plastic liner to thermally insulate the first-named bulkhead against the heat of combustion of the propellant when the propellant has been ignited by the igniting means carried by said cover.

3. A rocket engine according to claim 2 including means for detachably securing the cover to said shell in such manner that the cover and igniting means carried thereby are blown away from the shell by pressure of the exhaust gases as the propellant explosive is ignited by the igniting means carried by said cover.

4. A rocket motor for a subaqueously launched missile and having a thin metal cylindrical shell, a bulkhead carrying a plurality of exhaust nozzles and secured to one end of said shell, a plastic liner bonded to the interior of said shell and said bulkhead respectively for reinforcing the shell against pressure externally applied thereto as the missile is launched, a quantity of imperforate end burning propellant explosive snugly fitted in said liner in a manner to form a plenum chamber at one end thereof opposite said nozzles, and a second bulkhead secured to the opposite end of said shell in a manner to form a second plenum chamber between a transverse wall thereof and the opposite end of said propellant explosive, a plurality of thrust reversal nozzles formed within said second bulkhead in communication with said second plenum chamber, and a pyrogen igniter in communication with said second plenum chamber and carried by said second bulkhead for igniting the opposite end of said propellant explosive thereby to apply a reverse thrust to said engine.

5. A rocket motor according to claim 4 including a hollow cylindrical portion formed integrally with said second bulkhead for engagement with an end portion of said shell, and a plastic liner bonded to the interior surface of said hollow cylindrical portion and engageable by an end portion of said first named plastic liner when the second bulkhead is secured thereto for effecting a thermal insulation between the propellant explosive and the second bulkhead at the hollow cylindrical portion thereof.

6. A rocket motor according to claim 5 including a continuous weld for securing the first-named bulkhead to said shell.

7. The rocket motor of claim 6 including a plurality of bolts for securing the second bulkhead to the shell.

8. The rocket motor of claim 7 in which the plurality of thrust reverse nozzles are sealed until the pyrogen igniter has functioned, and includes a plurality of generally tapered plastic plugs equal in number to the number of said reverse nozzles and snugly fitted therein, said plugs being expelled by said propellant explosive as the propellant explosive is fired at said opposite end thereof by said pyrogen igniter.

9. A rocket engine having a thin metal cylindrical shell of a diameter suitable for launching from the torpedo tube of a submarine, a pair of bulkheads secured to said shell, a plastic liner bonded to the interior of said shell and to one of said bulkheads for reinforcing the shell against pressure externally applied thereto as the engine is launched, a quantity of end burning propellant explosive snugly fitted within said plastic liner in a manner to form a pair of plenum explosive chambers, each of said chambers being at one end of the explosive respectively, a plurality of jet nozzles carried by one of said bulkheads, at least one pyrogen igniter for igniting an end portion of said propellant opposite said nozzles, means including a cover detachably secured to an end portion of said shell for enclosing said nozzles, said pyrogen igniter being carried by said cover at a firing position within a respective nozzle, a safety bar detachably secured to said rocket motor while the motor is within the torpedo tube and adapted to be detached therefrom when the motor has been launched from the tube, means controlled by said safety bar for igniting said pyrogen igniter thereby to cause the cover to be detached from the shell by the propellant explosive when the propellant explosive has been ignited thereby, a metallic duct secured interiorly along the length of said shell and covered by said liner, and at least one cable having a plurality of electrical conductors therein disposed within said duct, at least one of said conductors supplying power to fire said pyrogen igniter as the safety bar is removed.

10. A rocket engine having a thin cylindrical shell composed of steel and adapted to be launched from the torpedo tube of a submarine, a plastic liner bonded to the interior surface of the shell along the length thereof for reinforcing the shell against pressure externally applied thereto as the engine is launched, a bulkhead secured to said shell and having a plurality of jet nozzles carried thereby, a second bulkhead secured to the opposite end of said shell and having a plurality of normally sealed jet nozzles formed therein and extending therethrough at an acute angle with respect to the axis of the rocket engine, a quantity of propellant explosive snugly fitted within said plastic liner in a manner to form a plenum chamber between an end portion thereof and the first-named bulkhead and a second plenum chamber between the opposite end thereof and the second bulkhead, means including a pyrogen igniter for igniting the end of the propellant explosive adjacent said nozzles, means including a blow off cover detachably secured to an end of said shell for initially enclosing said nozzles of the first-named bulkhead in a position to ignite the propellant explosive, said cover and igniter being blown off from the shell as the end of the propellant explosive adjacent the first-named bulkhead is ignited, means on the second bulkhead for detachably securing a depth bomb thereto, and a second pyrogen igniter carried by said second bulkhead for igniting the opposite end of said propellant explosive thereby to unseal the nozzles within said second bulkhead by pressure from the propellant explosive and separate the rocket engine from the depth bomb during flight as the igniter within the second bulkhead is activated to ignite the end of the propellant explosive adjacent thereto.

References Cited in the file of this patent

UNITED STATES PATENTS

| | | |
|---|---|---|
| 2,776,623 | Bonner | Jan. 8, 1957 |
| 2,850,976 | Seifert | Sept. 9, 1958 |
| 2,876,620 | Weinland et al. | Mar. 10, 1959 |
| 2,877,504 | Fox | Mar. 17, 1959 |
| 2,939,275 | Loedding | June 7, 1960 |
| 3,004,734 | Radford | Oct. 17, 1961 |
| 3,026,772 | Moreland | Mar. 27, 1962 |
| 3,027,709 | Welder | Apr. 3, 1962 |
| 3,029,734 | Allenson | Apr. 17, 1962 |
| 3,039,264 | Ernest | June 19, 1962 |